(12) United States Patent
Brennan et al.

(10) Patent No.: US 10,939,697 B2
(45) Date of Patent: Mar. 9, 2021

(54) SHORT-TERM WASH TREATMENT OF PRODUCE

(71) Applicant: SMARTWASH SOLUTIONS LLC, Salinas, CA (US)

(72) Inventors: James M. Brennan, Pleasanton, CA (US); Danny Elmer Lindstrom, Salinas, CA (US); Christopher Michael McGinnis, Seaside, CA (US); Eric Child Wilhelmsen, Milpitas, CA (US)

(73) Assignee: SMARTWASH SOLUTIONS, LLC, Salinas, CA (US)

( * ) Notice: Subject to any disclaimer, the term of this patent is extended or adjusted under 35 U.S.C. 154(b) by 241 days.

(21) Appl. No.: 15/945,176

(22) Filed: Apr. 4, 2018

(65) Prior Publication Data

US 2018/0220693 A1 Aug. 9, 2018

Related U.S. Application Data

(62) Division of application No. 15/208,927, filed on Jul. 13, 2016.

(Continued)

(51) Int. Cl.
| | |
|---|---|
| *A23N 12/02* | (2006.01) |
| *A23B 4/12* | (2006.01) |
| *A23B 7/10* | (2006.01) |
| *A23L 3/3454* | (2006.01) |
| *B08B 3/04* | (2006.01) |
| *C11D 11/00* | (2006.01) |

(Continued)

(52) U.S. Cl.
CPC ............ *A23N 12/02* (2013.01); *A22C 17/08* (2013.01); *A23B 4/12* (2013.01); *A23B 4/24* (2013.01); *A23B 7/10* (2013.01); *A23L 3/3454* (2013.01); *B08B 1/002* (2013.01); *B08B 3/042* (2013.01); *B08B 3/08* (2013.01); *C11D 7/08* (2013.01); *C11D 7/261* (2013.01); *C11D 7/265* (2013.01); *C11D 11/0064* (2013.01); *A23V 2002/00* (2013.01); *Y02A 40/90* (2018.01)

(58) Field of Classification Search
None
See application file for complete search history.

(56) References Cited

U.S. PATENT DOCUMENTS

| | | | | |
|---|---|---|---|---|
| 2,223,168 | A | * 11/1940 | Dombrow | ............... A23B 7/10 426/287 |
| 5,462,678 | A | 10/1995 | Rosaen | |

(Continued)

*Primary Examiner* — Eric W Golightly
(74) *Attorney, Agent, or Firm* — Patterson + Sheridan, LLP

(57) ABSTRACT

A method of produce washing using a short-term wash device. The method of produce washing includes processing a product through the short-term wash device followed by a wash device, applying a short-term wash treatment using the short-term wash device to the product such that the short-term wash treatment remains on the product for a pretreatment time that lasts until the product reaches the wash device, and applying a wash treatment using the wash device to the product such that the wash treatment rinses the short-term wash treatment from the product defining the end of the pretreatment time, wherein the pretreatment time is set at or below a damage threshold time beyond which the short-term wash treatment damages the product beyond a damage threshold.

20 Claims, 9 Drawing Sheets

Related U.S. Application Data

(60) Provisional application No. 62/264,456, filed on Dec. 8, 2015.

(51) Int. Cl.
    *A22C 17/08*     (2006.01)
    *A23B 4/24*     (2006.01)
    *B08B 1/00*     (2006.01)
    *B08B 3/08*     (2006.01)
    *C11D 7/08*     (2006.01)
    *C11D 7/26*     (2006.01)

(56) References Cited

U.S. PATENT DOCUMENTS

| | | |
|---|---|---|
| 6,112,429 A | 9/2000 | Mitchell et al. |
| 6,584,991 B1 | 7/2003 | Ries |
| 2007/0137678 A1 | 6/2007 | Bertolini |
| 2008/0274263 A1* | 11/2008 | Mazin ............ A23B 7/022 426/640 |
| 2011/0008866 A1 | 1/2011 | Dibel et al. |
| 2011/0247655 A1 | 10/2011 | Lewis et al. |
| 2012/0000488 A1 | 1/2012 | Herdt et al. |
| 2015/0157034 A1* | 6/2015 | McEntire, Jr. ....... B26D 7/088 426/335 |

* cited by examiner

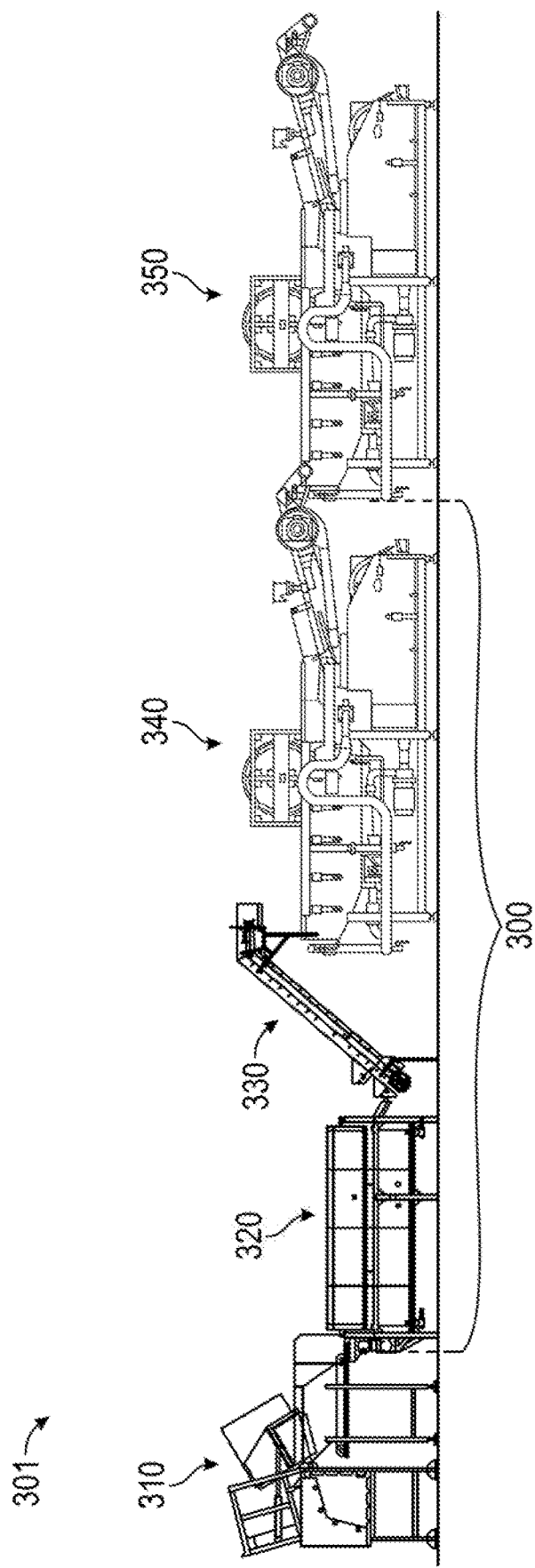

SHORT-TERM WASH TREATMENT OF PRODUCE

CROSS-REFERENCE TO RELATED APPLICATIONS

This application is a divisional of U.S. application Ser. No. 15/208,927, filed on Jul. 13, 2016, which claims the benefit of U.S. Provisional Application No. 62/264,456, filed on Dec. 8, 2015, both of which are hereby incorporated by reference in their entirety.

BACKGROUND

Technical Field

Apparatuses and methods consistent with exemplary embodiments relate to a novel synergistic sanitation strategy for fresh produce processing using a short-term wash treatment applied by a short-term wash device followed by a wash device in a produce line.

Description of the Related Art

Most Ready-To-Eat (RTE) produce is processed with two stage washing. Repeating the same wash a third time generally yields no further benefits if the first two stages have been properly managed. For example, the primary wash system may remove dirt and debris. The primary wash system may also handle the bulk of the soluble organic load from any cutting or chopping operation. The secondary wash, whose water chemistry is generally easier to manage, is intended to complete the sanitation of the product. In recent years, the improved control of the water chemistry of both the primary and secondary wash systems has led to improvements in the sanitation of washed products and the control of cross contamination; however, more improvement is still needed to better mitigate microbial risk to consumers.

Much research has been done exploring the various compatible sanitizing agents for use in these two stage wash systems including chlorine, chlorine dioxide, ozone, and other active oxygen species. Other sanitizing agents have been considered such as fatty acids, organic acids, and silver ions but are not in use. None of these chemicals has provided a 4 log lethality to achieve a chemical pasteurization of the RTE product in a commercial setting. In fact, most processes fail to yield a consistent 2 log reduction. Some have asserted greater lethality in bench scale tests, but these greater lethality values do not carry over to commercial processing and often involve artificial conditions where a large number of organisms are applied and removed without time to become established on the product under test. Thus, currently no one is reporting a commercial pasteurization of an RTE produce product.

Engineering efforts have produced various flumes and tanks to provide agitation and mechanical action to enhance the sanitation process. For example, air jets and turbulence are designed into these systems. None of these designs has been so overwhelmingly successful that all pervious equipment designs were superseded. In some cases, different designs are preferred for certain product types for product quality reasons. For these and other reasons, the RTE industry includes a wide variety of equipment.

Researchers have attempted to incorporate other sanitation strategies into process lines. The considered mechanisms of lethality include ultra-violet light, sonic energy, electric fields and electrical current and other exotic mechanisms. Here too, none of these approaches have entered into commercial practice. The search for additional lethality continues.

In spite of all this effort, pathogens remain at low levels on RTE produce as delivered to consumers. The hazard is generally small but is not zero as there continue to be outbreaks and recalls. Some of these problems probably reflect poor application of existing art. Nevertheless, the RTE produce industry seeks more robust processes to assure consumer safety. Such processes will require the industry to do something different.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

According to an aspect of an exemplary embodiment, there is provided a produce wash system including a process stream including a short-term wash device followed by a wash device, a short-term wash treatment that is applied by the short-term wash device to a product, wherein the short-term wash treatment remains on the product for a pretreatment time that lasts until the product reaches the wash device, and a wash treatment that is applied by the wash device to the product, wherein the wash treatment rinses the short-term wash treatment from the product defining the end of the pretreatment time. The pretreatment time is set at or below a damage threshold time beyond which the short-term wash treatment damages the product beyond a damage threshold.

The short-term wash treatment may provide at least one or more from a group consisting of antimicrobial properties, potentiating properties for the antimicrobial action of the subsequent wash device and wash treatment, and controlling properties for controlling lachrymator release from the produce.

The product may be fresh produce that is at least one selected from a group consisting of whole, sliced, cut, and chopped leafy greens including but not limited to lettuce, spinach, cabbage, and kale, and vegetables including but not limited to broccoli, onions, bell peppers, and squash.

The product may be a meat product that is at least one selected from a group consisting of beef, pork, lamb, veal, game, and poultry that includes but is not limited to whole, parted, and boned poultry.

The short-term wash device includes a spray device that is configured to spray the short-term wash treatment on the product.

The short-term wash device may further include at least one from a group consisting of a rotating drum short-term wash device, an air column short-term wash device, a slicer/dicer device, a spray curtain, a shaker, and a timing belt, wherein the spray device may be integrated with the at least one from the group to spray the short-term wash treatment on the product.

The short-term wash device may include a product submersing device that is configured to receive and submerse the product into the short-term wash treatment followed by the product being sifted out of the short-term wash treatment.

The product submersing device may be at least one selected from of a group consisting of a rotating drum short-term wash device, a submersing pool pretreatment device, an agitating pool pretreatment device, and a spray curtain with brushes.

The short-term wash treatment may include an acidulant and a polyol. The acidulant may be one selected from a group consisting of a phosphoric acid and lactic acid, and the acidulant is from 0.1% to 10% of the short-term wash treatment, and the polyol maybe one selected from a group consisting of a glycerin and a propylene glycol, and the polyol is from 0.1% to 10% of the short-term wash treatment.

The pretreatment time the short-term wash treatment remains on the product may be between 3 seconds and 1.5 minutes at a temperature between 30° F. and 50° F.

The wash treatment may include free active chlorine from 2 to 40 ppm of the wash treatment, a compatible acidulant selected from a group consisting of phosphoric acid, citric acid, and lactic acid, and wherein the compatible acidulant is from 10 to 1000 ppm of the wash treatment, and a polyol selected from a group consisting of a glycerin and a propylene glycol, and wherein the polyol is from 2 to 500 ppm of the wash treatment.

The short-term wash treatment may include a coordinating acid and silver ions, wherein the coordinating acid is one selected from a group consisting of a citric acid and a lactic acid and is from 3% to 5% of the short-term wash treatment, and wherein the silver ions are from 10 to 50 ppm of the short-term wash treatment.

The pretreatment time the short-term wash treatment remains on the product may be between 3 seconds and 1.5 minutes at a temperature between 30° F. and 50° F.

The wash treatment may include a compatible acidulant selected from a group consisting of phosphoric acid, citric acid, and lactic acid, wherein the compatible acidulant is from 10 to 1000 ppm of the wash treatment, a polyol selected from a group consisting of glycerin and propylene glycol, wherein the polyol is from 1 to 500 ppm of the wash treatment, free active chlorine from 2 to 40 ppm of the wash treatment, and chloride from 1 to 100 ppm of the wash treatment.

The produce wash system may further include a transfer belt between the short-term wash device and the wash device, the transfer belt configured to serve as a drain scroll to recycle the short-term wash treatment, and a timing belt that is configured to help complete the pretreatment time.

The short-term wash treatment and short-term wash device may be configured to account for at least one of product overload, inadequate chlorine in a wash tank, and incomplete pH control.

The short-term wash treatment may provide a supplemental wash lethality of greater than 1 log against microbes found on the product as compared to the lethality of the wash treatment in the wash system alone.

According to another exemplary embodiment, there is provided a pre-rinse prior to the short-term wash treatment. This pre-rinse is positioned so as to prevent soil and debris from interfering with the short-term wash treatment or from being carried over into the wash system. It can be advantages to make this pre-rinse the last use of wash water prior to disposal.

According to an aspect of another exemplary embodiment, there is provided a method of produce washing using a short-term wash device. The method includes processing a product through the short-term wash device followed by a wash device, applying a short-term wash treatment using the short-term wash device to the product such that the short-term wash treatment remains on the product for a pretreatment time that lasts until the product reaches the wash device, and applying a wash treatment using the wash device to the product such that the wash treatment rinses the short-term wash treatment from the product defining the end of the pretreatment time, wherein the pretreatment time is set at or below a damage threshold time beyond which the short-term wash treatment damages the product beyond a damage threshold.

According to an aspect of another exemplary embodiment, there is provided a short-term wash treatment that includes an acidulant selected from a group consisting of a phosphoric acid and lactic acid, wherein the acidulant is from 0.1% to 10% of the short-term wash treatment, and a polyol selected from a group consisting of a glycerin and a propylene glycol, wherein the polyol is from 0.1% to 10% of the short-term wash treatment, wherein a pretreatment time the short-term wash treatment remains on the product is between 3 seconds and 1.5 minutes at a temperature between 30° F. and 50° F.

Other aspects and advantages of the invention will be apparent from the following description and the appended claims.

BRIEF DESCRIPTION OF DRAWINGS

FIG. 3 is a schematic of a produce wash system in a produce line according to an exemplary embodiment of the present disclosure;

Figure 1A:
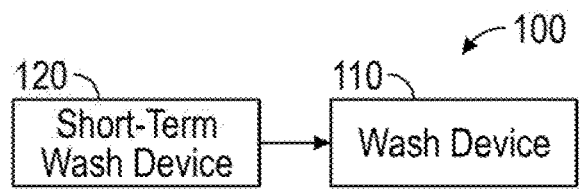
FIGS. 1A through 1C are block diagrams showing a produce wash system according to one or more exemplary embodiments of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

In the following detailed description of the illustrative embodiments reference is made to the accompanying drawings that form a part thereof and is provided to assist the reader in gaining a comprehensive understanding of the methods, apparatuses, and/or systems described herein. These embodiments are described in sufficient detail to enable those skilled in the art to practice the invention, and it is understood that other embodiments may be utilized and that logical structural, mechanical, electrical, and chemical changes may be made without departing from the spirit or scope of the invention. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order.

To avoid detail not necessary to enable those skilled in the art to practice the embodiments described herein, the description may omit certain information known to those skilled in the art. Also, the respective descriptions of well-known functions and constructions may be omitted for increased clarity and conciseness. Further, the description of an exemplary embodiment of the present invention is merely an exemplary embodiment for structural and functional explanation of the present invention. The following detailed description is, therefore, not to be taken in a limiting sense, and the scope of the illustrative embodiments is defined only by the appended claims.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion and thus should be interpreted to mean "including, but not limited to." Unless otherwise indicated, as used throughout this document, "or" does not require mutual exclusivity.

Terms such as "first" and "second," etc., may be used to distinguish one component from another. Additionally, it will be understood that when an element is referred to as being "connected to" or "communicatively connected to" another element, it can be directly connected to the other element, wirelessly connected to the other element, or intervening elements may also be present. In contrast, when an element is referred to as being "directly connected to" another element, no intervening elements are present. Meanwhile, other expressions describing relationships between components such as "between," "immediately between" or "adjacent to" and "directly adjacent to" may be construed similarly.

The following description describes methods and systems for washing product/produce using a short-term wash treatment and short-term wash device along with a wash device in a produce line. Specifically, methods and systems are disclosed that can provide additional wash benefits such as additional microbial lethality through the use of a short-term wash treatment and device. The product may be fresh produce that is at least one selected from a group consisting of whole, sliced, cut, and chopped leafy greens including, but not limited to, lettuce, spinach, cabbage, and kale, and vegetables including, but not limited to, broccoli, onions, bell peppers, and squash. The produce product may alternatively be a meat product that is at least one selected from a group consisting of beef, pork, lamb, veal, game, and poultry that includes, but is not limited to, whole, parted, and boned poultry.

Figure 1B:
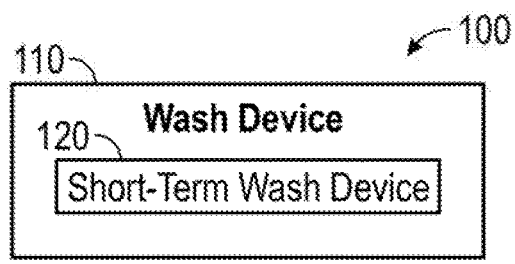
Figure 1C:
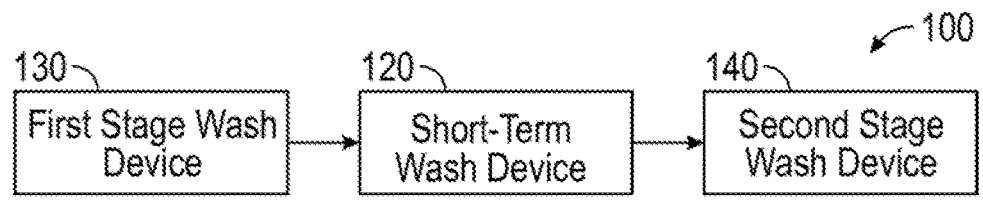

FIGS. 1A through 1C show block diagrams of a produce wash system 100 according to one or more exemplary embodiments. For example, FIG. 1A shows a produce wash system 100 that includes a wash device 110 and a short-term wash device 120 according to an exemplary embodiment. The short-term wash device 120 is placed such that it is first in the process flow. Next is provided a wash device 110 that is provided after the short-term wash device 120 in the process flow such that the wash device 110 receives product/produce from the short-term wash device 120. Particularly, the short-term wash device 120 initially washes product and then provides the product to the wash device 110 which rinses the product and washes the product using a normal wash cycle.

FIG. 1B shows a produce wash system 100 that includes a wash device 110 and a short-term wash device 120. In this embodiment, the short-term wash device 120 is provided at some point within the wash device 110. Accordingly, product that is provided to the wash device 110 will first be washed by the short-term wash device 120 and then provided to the wash device 110 for rinsing and a normal wash cycle.

FIG. 1C shows a produce wash system 100 that includes a short-term wash device 120 as well as a first stage wash device 130 and a second stage wash device 140. The first stage wash device 130 is provided before both the short-term wash device 120 and the second stage wash device 140. Accordingly, the first stage wash device 130 does a preliminary normal wash cycle. The short-term wash device 120 is provided next such that is receives the product from the first stage wash device 130. The short-term wash device 120 then washes the product using a short-term wash treatment and sends the product on to the second stage wash device 140. The second stage wash device 140 receives the product and proceeds to rinse and wash the product using a normal wash cycle similar to the first stage wash device 130. By providing the first stage wash device 130 first it allows that wash cycle to deal with the initial produce load so that the short-term wash device can be better controlled and applied consistently to the produce.

According to another exemplary embodiment, similar benefits can be derived from a pre-rinse wherein the rinse removes the initial organic load and debris such as soil. This pre-rinse allows the short-term treatment to be more effective and potential reduces total water usage. The pre-rinse is done prior to the short-term wash treatment. This pre-rinse is positioned so as to prevent soil and debris from interfering with the short-term wash treatment or from being carried over into the wash system. It can be advantages to make this pre-rinse the last use of wash water prior to disposal.

Figure 2A:
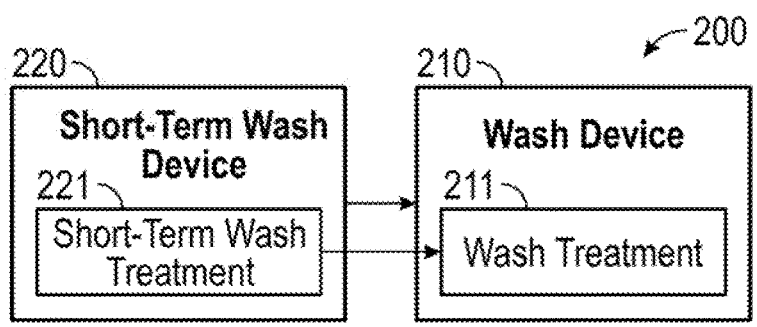
FIGS. 2A and 2B are block diagrams showing a produce wash system according to one or more exemplary embodiments of the present disclosure.
Figure 2B:
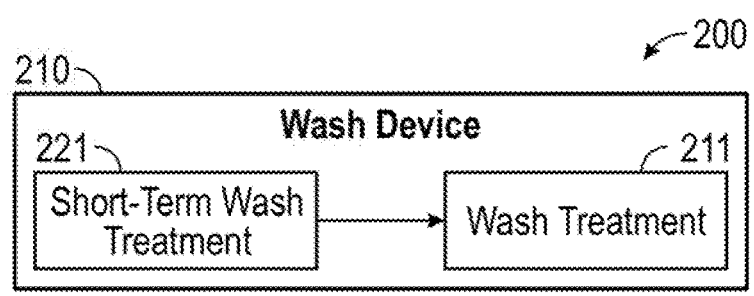

FIGS. 2A and 2B are block diagrams showing a produce wash system 200 and the specific treatments that are used to wash product/produce according to one or more exemplary embodiments. For example, FIG. 2A shows a produce wash system 200 that includes a short-term wash device 220 and a wash device 210. The short-term wash device 220 receives and washes the product using a short-term wash treatment 221. The product is then provided to the wash device 210. The wash device 210 takes the produce that has been washed using the short-term wash treatment 221 and rinses and washes the product using a wash treatment 211. According to another exemplary embodiment as shown in FIG. 2B, a produce wash system 200 includes a wash device 210 that is provided with both the short-term wash treatment 221 and the wash treatment 211. The wash device 210 first applies the short-term wash treatment 221 to received product. Then, after a set pretreatment time period, the wash device 210 switches to the wash treatment 211. The wash treatment 211 is then applied to the product thereby rinsing the product of the short-term wash treatment 221 and further washes the product using the wash treatment 211.

FIG. 3 is a schematic of a produce wash system 300 in a produce line 301 according to an exemplary embodiment. The produce line 301 includes a trim belt 310, a rotating drum short-term wash device 320, a timing belt 330, a first wash stage device 340, and a second wash stage device 350. The produce wash system 300 includes the subset of items including the rotating drum short-term wash device 320, the timing belt 330, and the first wash stage device 340. In another embodiment, the timing belt 330 may be excluded by elevating the rotating drum short-term wash device 320 in relation to the first wash stage device 340. This can be accomplished by elevating the rotating drum short-term wash device 320 using a platform or an elevated floor or by setting the first wash stage device 340 on a lower surface compared to the rotating drum short-term wash device 320 such that the rotating drum short-term wash device 320 can directly provide the product to the first wash stage device 340. The overall produce line 301 first includes the trim belt 310 which is configured to initially receive the product/produce for processing. The trim belt 310 provides the product to the rotating drum short-term wash stage device 320 that applied a short-term wash treatment to the product. The short term wash treatment is left on the product for a short prewash treatment time period which can be adjusted using the timing belt 330 onto which the product is provided once out of the rotating drum short-term wash device 320. The product then travels along the timing belt 330 and then is deposited into the first wash stage device 340 which applied a wash treatment to the product. The wash treatment rinses off the short-term wash treatment and further provides additional slower less abrasive/damaging washing of the product. From there the product then continues along the produce line 301 entering into the second wash stage device 350 for another round of washing using a wash treatment. Once this wash step is complete the product is ready to move along the produce line 301 to be further processed and packaged by other device (not shown).

Figure 4:
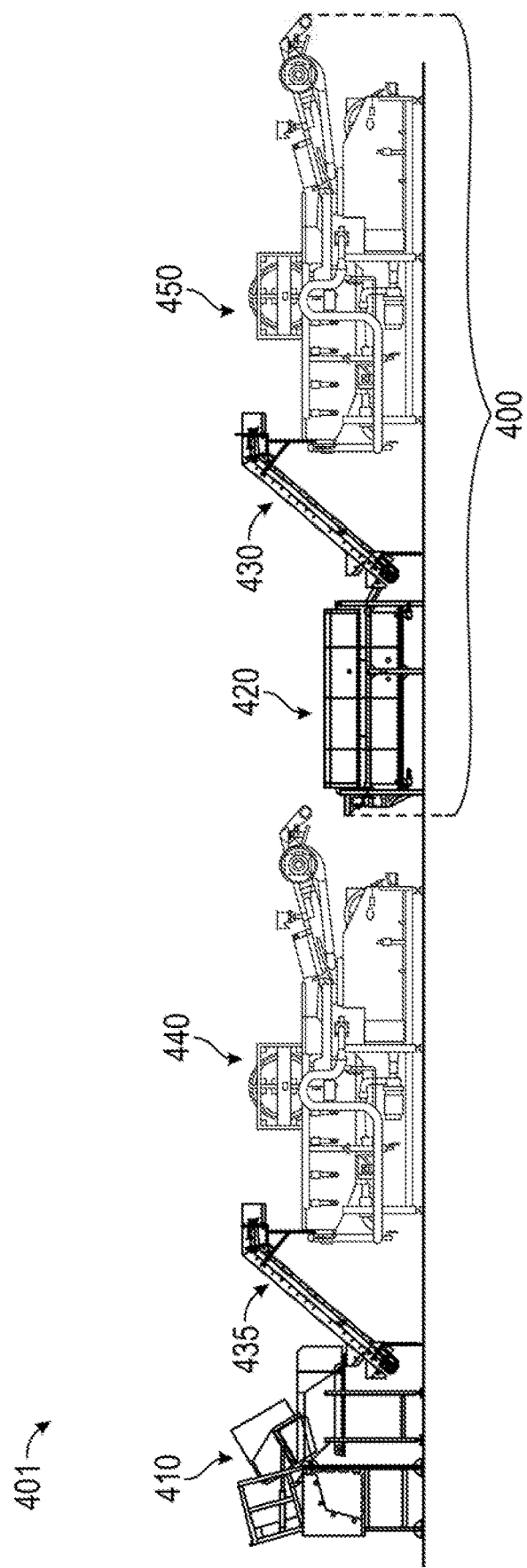
FIG. 4 is a schematic of a produce wash system in a produce line according to an exemplary embodiment of the present disclosure.

According to another exemplary embodiment, FIG. 4 shows a schematic of a produce wash system 400 in a produce line 401 placed at a different location along the produce line 401 along with some different devices. Specifically, in this embodiment the produce line 401 includes a trim belt 410, a first timing belt 435, a first wash stage device 440, a rotating drum short-term wash device 420, a second timing belt 430, and a second wash stage device 450 provided in the order. Thus, the product is initially provided to the trim belt 410, which after processing sets the product onto the first timing belt 435. The first timing belt 435 transfers the product into the first wash stage device 440. The first wash stage device 440 does a first wash of the product using a wash treatment. The first wash stage device 440 then deposits the product into the rotating drum short-term wash device 420. The rotating drum short-term wash device 420 applies a short-term wash treatment to the product and then sends the product along the produce line 401 toward the next wash cycle. Specifically, the product is provided onto the second timing belt 430 which rotates and moves the product at such a pace that the short-term wash treatment is left on the product for a set prewash time period before it is finally received at the second wash stage device 450 which rinses the short-term wash treatment off the product using the wash treatment found within the second wash stage device 450 which also further provides additional cleaning properties.

Figure 5:
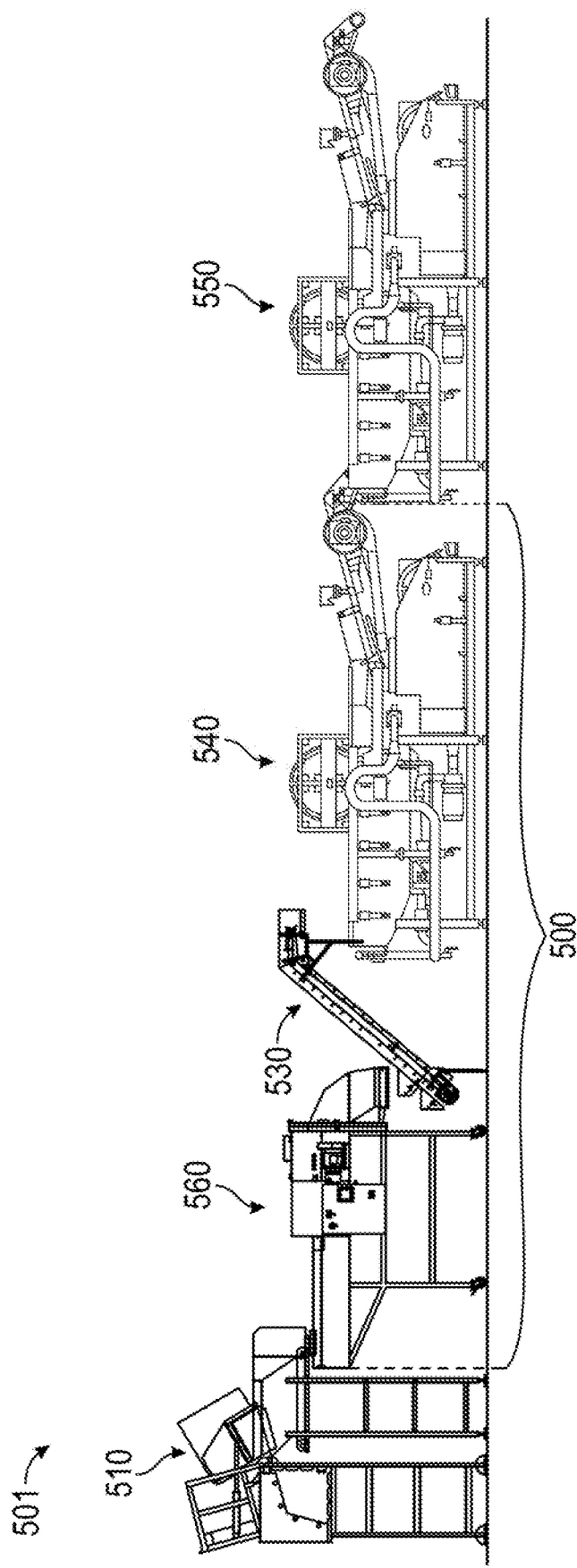
FIG. 5 is a schematic of a produce wash system in a produce line according to an exemplary embodiment of the present disclosure.

According to an exemplary embodiment, FIG. 5 shows a schematic of a produce wash system 500 in a produce line 501 that uses a different type of short-term wash device for applying the short-term wash treatment. Specifically, the produce wash system 500 includes a slicer/dicer short-term wash device 560, a timing belt 530, and a first wash stage device 540. In addition to the produce wash system 500, which includes the slicer/dicer short-term wash device 560, the timing belt 530, and the first wash stage device 540, the produce line 501 further includes a trim belt 510 that initially feeds the product to the produce wash system 500 and a second wash stage device 550 that takes the product from the produce wash system 500 and runs a second wash cycle using wash treatment.

It is instructive to consider a specific embodiment. For example, to prepare chopped Romaine lettuce with a two tank flotation line using a silver dihydrogen citrate short-term wash treatment, a system such as illustrated in FIG. 5 can be used. In this system, product such as head lettuce is fed into the slicer/dicer short-term wash device 560 when it is treated with the silver solution. The slicer/dicer short-term wash device 560 affords efficient distribution of the treatment solution. This solution needs to be substantially chloride free or the silver ions are rendered inactive as a cloudy precipitate. It can generally be recycled with makeup for the solutions carried forward with the product on the timing belt 530. The speed of the timing belt 530 is adjusted according to the time required for treating the particular product, which is generally between 30 and 60 seconds. Longer treatments are less practical given the product throughput and the potential for treatment solutions to shorten the shelf-life. The impact of the silver solution is quenched by delivery of the product into the first wash stage device 540. Makeup water enters the first wash stage device 540 as a final rinse after the second wash stage 550. Water from the second wash stage 550 is used as makeup water for the first wash stage device 540. One skilled in the art will recognize that many different wash systems could be coupled to this short-term wash treatment system.

Figure 6:
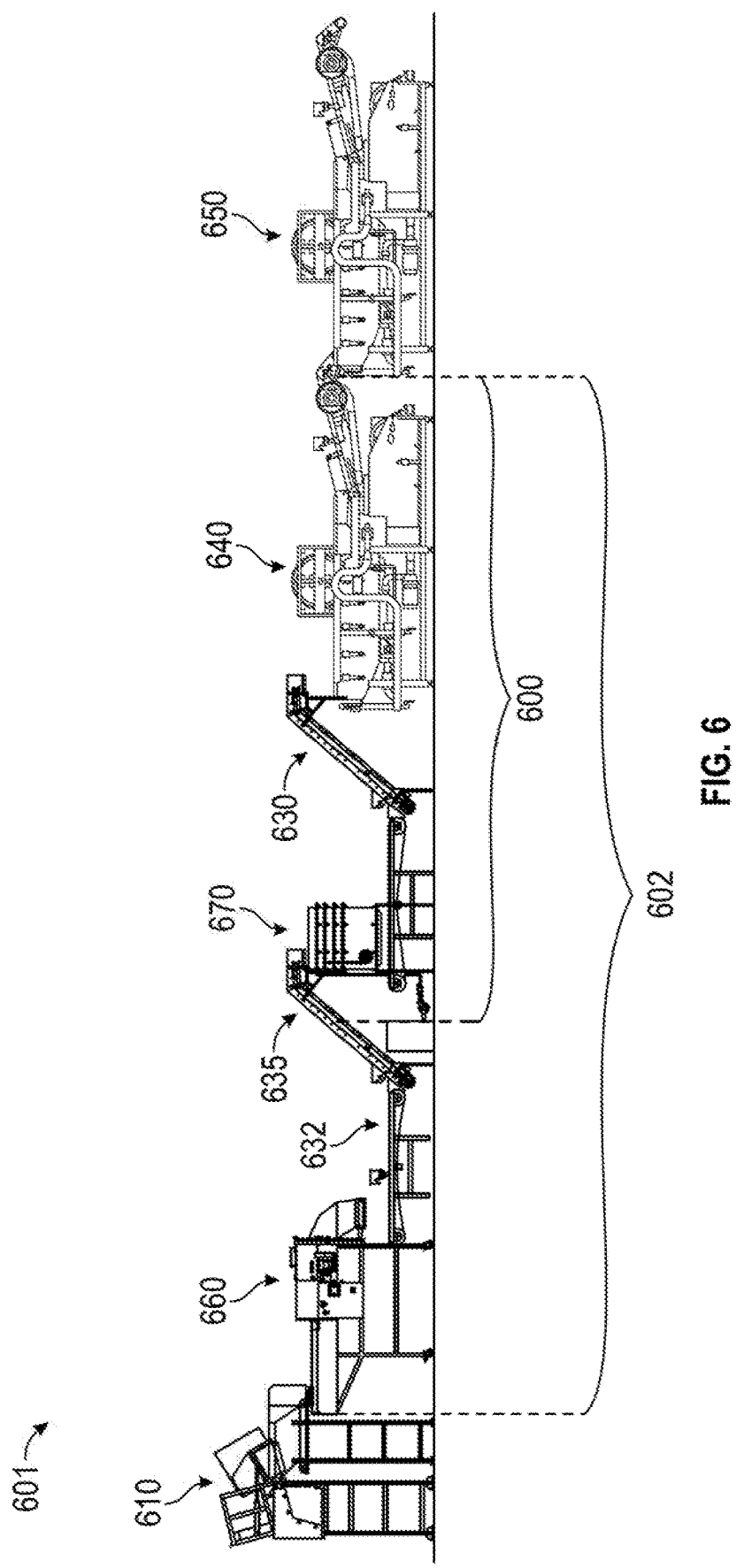
FIG. 6 is a schematic of a produce wash system in a produce line according to an exemplary embodiment of the present disclosure.

According to one or more exemplary embodiments one or more short-term wash devices may be included in the produce line 601, one or both of which may be used to apply the same or different short-term wash treatments. For example, FIG. 6 shows a schematic of a first produce wash system 600 in a produce line 601 according to an exemplary embodiment. The first produce wash system 600 includes an air column short-term wash device 670, a second timing belt 630, and a first wash stage device 640. The air column short-term wash device 670 may be a fluidized bed according to an embodiment. In addition to the first produce wash system 600, the produce line 601 further includes a trim belt 610, a slicer/dicer 660 with rinse, a transfer belt 632, a first timing belt 635, and a second wash stage device 650. Thus, product/produce is initially provided at the trim belt 610 which deposits the produce into the slicer/dicer that processes the produce and deposits it on the transfer belt 632 that places the produce onto the first timing belt 635 where the produce is taken and placed into the air column short-term wash device 670. The air column short-term wash device 670 applies a short-term wash treatment to the produce and then transfers the produce to the second timing belt 630 which takes the produce and deposits the produce into the first wash stage device 640 that contains a wash treatment. The wash treatment is thereby applied to the produce rinsing off the short-term wash treatment and further washing the produce. The produce is then provided into the second wash stage device 650 where the produce undergoes another round of wash treatment application.

Further, in another embodiment, FIG. 6 also shows a second produce wash system 602 that includes both a first and second short-term wash devices. Specifically, the slicer/dicer 660 can also apply a short-term wash treatment while processing the produce and can therefore operate as a slicer/dicer style short-term wash device 660. This short-term wash device 660 may apply a short-term wash treatment that can, for example, control properties for controlling lachrymator release from the produce. The produce is then transferred using the transfer belt 632 to the first timing belt 635 and into the air column short-term wash device 670 that applies a second short-term wash treatment that can totally or partially rinse the initially applied short-term wash treatment. The second short-term wash treatment may provide antimicrobial properties and/or potentiating properties for subsequent wash treatments. From the air column short-term wash device 670 the produce is then transferred to the second timing belt 630 that takes the produce which then continues on through the first wash stage device 640 and the second wash stage device 650.

Figure 7:
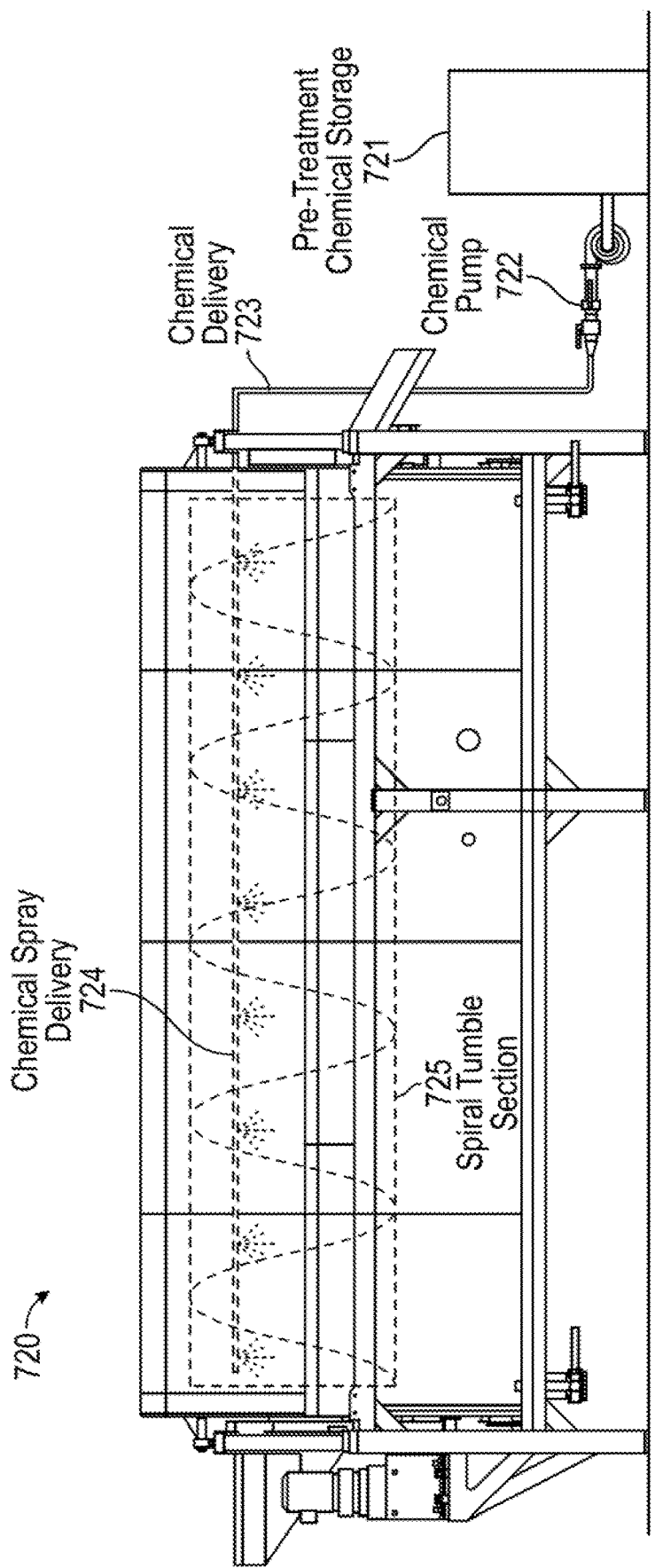
FIG. 7 is a short-term wash device including a rotating drum for commercial wash control according to an exemplary embodiment of the present disclosure.

According to one or more embodiments, FIG. 7 shows a rotating drum short-term wash device 720 similar to the rotating drum short-term wash devices 320 and 420 shown in FIG. 3 and FIG. 4, respectively. According to one embodiment, the rotating drum short-term wash device 720 includes at least a rotating drum 725, which may also be called a spiral tumble section 725, for commercial wash control. The rotating drum short-term wash device 720 includes short-term wash treatment chemical storage container 721, a chemical pump 722, and a chemical delivery system 723 that includes chemical spray delivery devices 724, which may also be called a spray curtain, spray nozzles, or simply a spray device. Thus, as produce is provided into the spiral tumble section 725, the chemical pump 722 pumps the short-term wash treatment from the short-term wash treatment chemical storage container 721 into the chemical delivery system 723. The short-term wash treatment travels through the chemical delivery system 723 until it reaches the chemical spray delivery devices 724 that are disposed such that their spray stream falls into the spiral tumble section 725 onto the produce tumbling therein. Thus the produce is sprayed with the short-term wash treatment as the produced tumbles and travels through the rotating drum. The produce is then rotated along the spiral tumble section 725 and out of the rotating drum short-term wash device 720 toward a wash stage device that rinses off the short-term wash treatment using a wash treatment.

Figure 8:
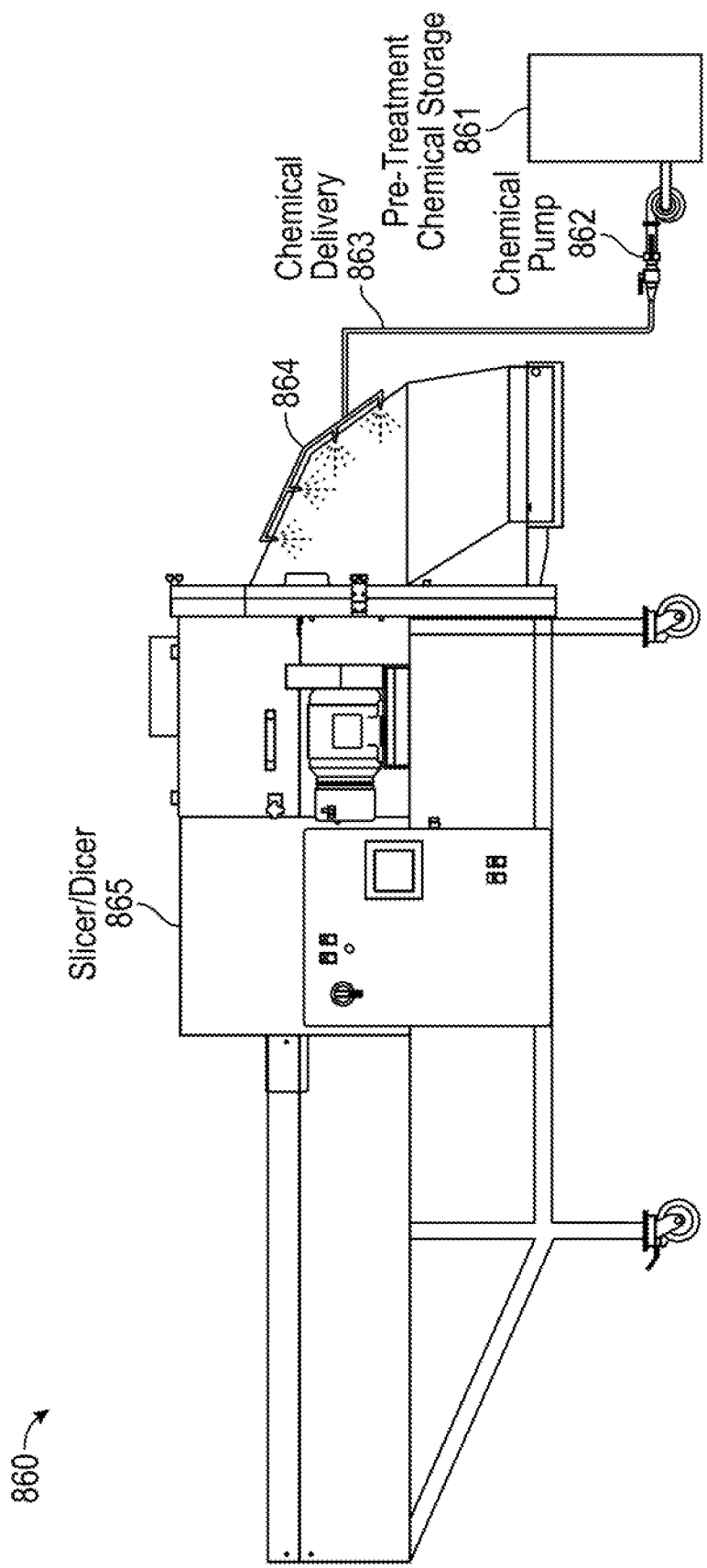
FIG. 8 is a short-term wash device including a slicer/dicer with spray nozzles according to an exemplary embodiment of the present disclosure.

According to one or more embodiments, FIG. 8 shows a short-term wash device 860 including a slicer/dicer 865 with spray delivery device 864, which may also be called spray nozzles, or a spray curtain, or simply a spray device according to an exemplary embodiment. The short-term wash device 860 is similar to the slicer/dicer type short-term wash devices 560 and 660 from FIG. 5 and FIG. 6, respectively. The short-term wash device 860 also includes a short-term wash treatment chemical storage container 861 and a chemical pump 862 that provides the short-term wash treatment to a chemical delivery system 863 that includes the spray nozzles 864. The short-term wash treatment chemical storage container 861 is configured to store the short-term wash solution. Thus, the short-term wash treatment is pumped from the short-term wash treatment chemical storage container 861 using the chemical pump 862 through the chemical delivery system 863 and out the spray nozzles 864 as shown. According to other embodiments, the spray nozzles 864 may be placed within the slicer/dicer 865, before the slicer dicer 865, after the slicer/dicer 865 as shown, or a combination thereof.

Figure 9:
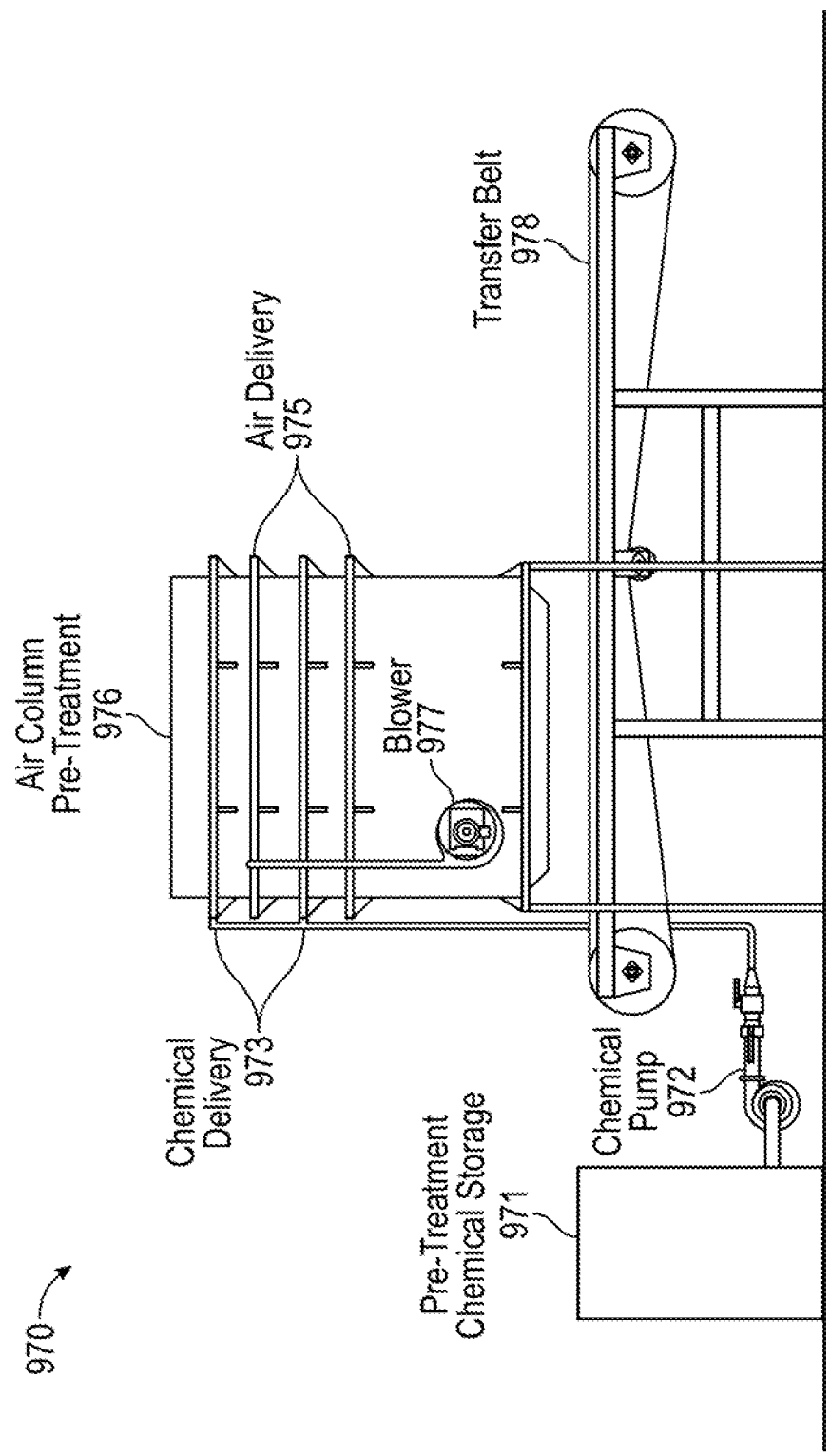
FIG. 9 is a short-term wash device including an air column wash system for short-term wash treatment according to an exemplary embodiment of the present disclosure.

FIG. 9 shows an air column short-term wash device 970 that includes an air column system 976 for short-term wash treatment application to produce according to an exemplary embodiment. The air column short-term wash device 970 is similar to the air column short-term wash device 670 as shown in FIG. 6. The air column short-term wash device 970 includes the air column system 976 that includes a blower 977 and an air delivery system 975 that delivers the air provided by the blower 977 into the air column system 976. The air column short-term wash device 970 also includes a short-term wash treatment chemical container 971, a chemical pump 972, and a chemical delivery system 973. The chemical pump 972 pumps the short-term wash treatment out from the short-term wash treatment chemical container where it is being stored and pumps it into the chemical delivery system 973. The chemical delivery system 973 provides the short-term wash treatment using nozzles placed near the air delivery system 975 such that the short-term wash treatment is provided into the air column system 976. Accordingly, the produce that is provided into the air column system 976 is coated with the short-term wash treatment and then provided onto a transfer belt 978 that transfers the produce to the next device in the produce line where the short-term wash treatment is either left on the produce for a prewash time period and/or rinsed off using a wash treatment.

Figure 10:
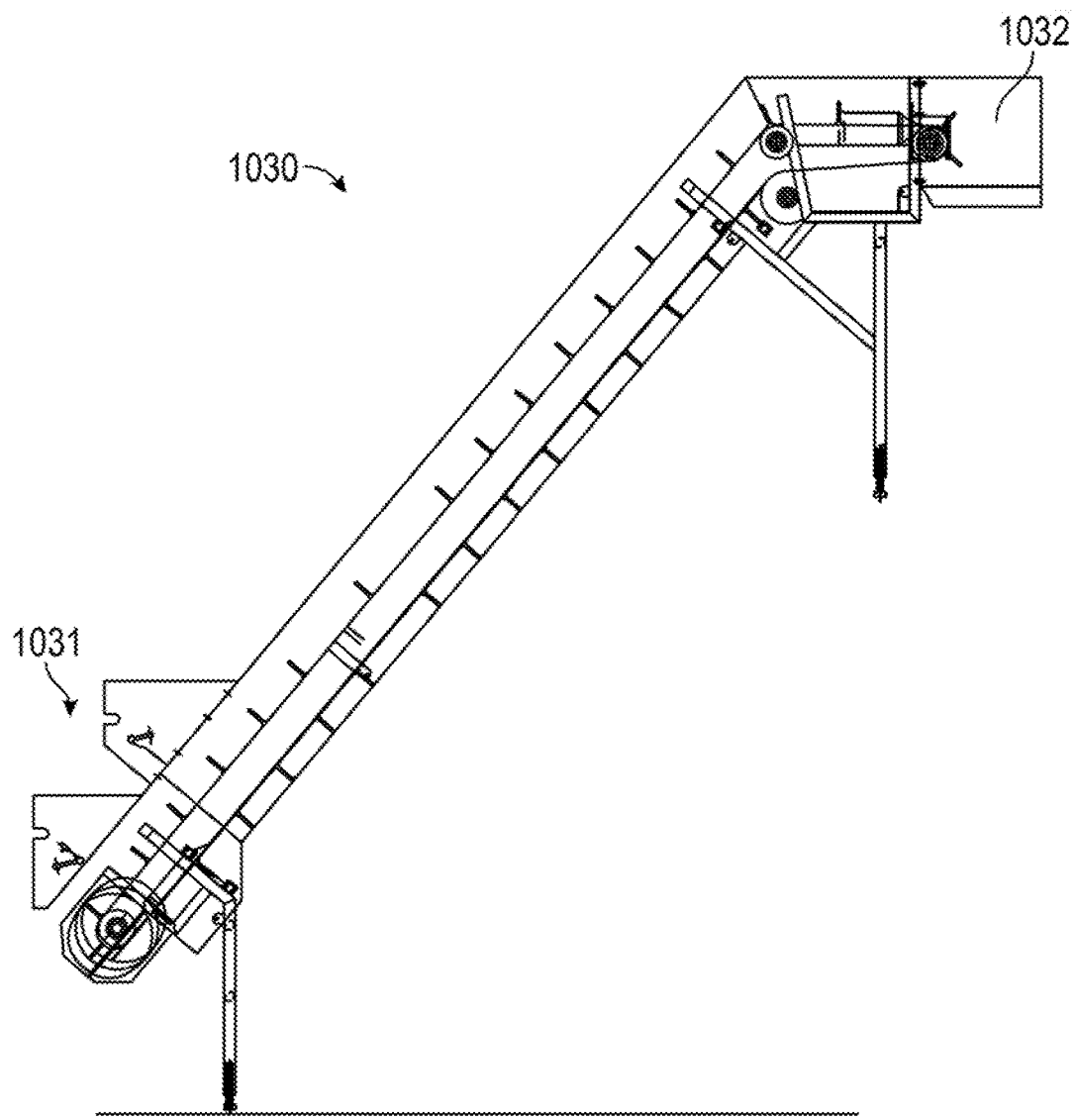
FIG. 10 is a timing belt according to one or more exemplary embodiments of the present disclosure.

FIG. 10 is a timing belt 1030 according to one or more exemplary embodiments of the present disclosure. The timing belt 1030 is substantially similar to the timing belts 330, 430, 435, 530, 630, and 635 as shown in FIGS. 3-6. The produce is provided at a first end 1031 of the timing belt 1030. The produce then travels up the timing belt 1030 and the timing belt rotates clockwise lifting the produce toward a second end 1032 that ends and drops the produce into the next device in a produce line. The timing belt 1030 can be set to rotate at different speeds in order to adjust the amount of time the short-term wash solution is on the produce to the desired length of time that the short-term wash treatment should be on the produce. As shown in FIGS. 7 through 10, the short-term wash device can take the form of a number of different devices but is not limited thereto. Particularly, the short-term wash device can be any number of other devices used in a produce line and can even be embodied as a device that's only function is to apply the short-term wash treatment. Accordingly, in one or more embodiments, the short-term wash device may be any device that is placed before another wash cycle that is configured to apply a short-term wash treatment to the product for a particular time before providing the treated product to the next wash cycle that rinses the short-term wash treatment from the product.

Figure 11:
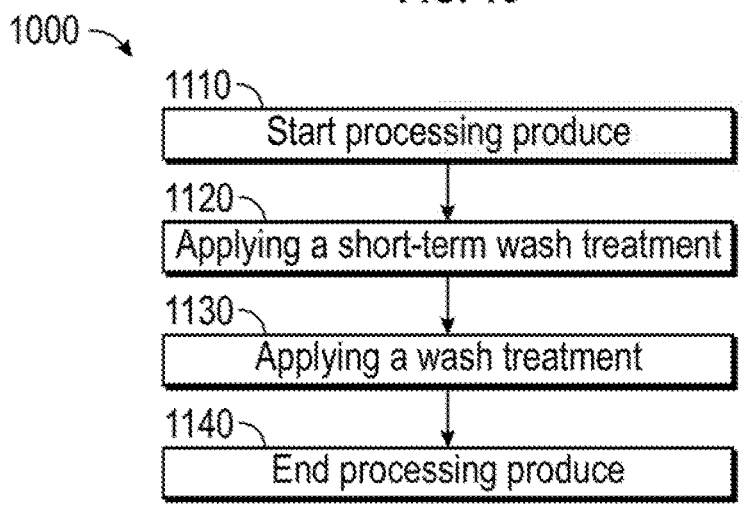
FIG. 11 is a flow chart showing a method of using a short-term wash treatment and/or short-term wash device according to one or more exemplary embodiments of the present disclosure.

FIG. 11 is a flow chart showing a method 1000 of using a short-term wash treatment and/or short-term wash device according to one or more exemplary embodiments. Initially, processing a product/produce begins by providing the produce into a trim belt that then deposits the produce into a produce wash device that includes a short-term wash device followed by a wash device (operation 1110). Then a short-term wash treatment is applied using the short-term wash device to the product such that the short-term wash treatment remains on the product for a pretreatment time that lasts until the product reaches the wash device (operation 1120). A wash treatment is then applied using the wash device to the product such that the wash treatment rinses the short-term wash treatment from the product defining the end of the pretreatment time (operation 1130). The pretreatment time is set at or below a damage threshold time beyond which the short-term wash treatment damages the product beyond a damage threshold. The damage can be defined as, for example, the point at which the produce discolors, wilts, changes taste, or other properties shift such that it can no longer be sold to a consumer. Finally, the product treatment process is either completed or may continue on through another round of washing in a second wash device or onto other processing and packaging steps (operation 1140).

A short-term wash, which may also be called an intense prewash treatment or prewash treatment, using a short-term wash treatment and device as well as a wash treatment and device synergistically enhances the lethality of traditional wash systems for ready-to-eat (RTE) produce. A short-term wash treatment and short-term wash device, which may also be called a prewash system, permits the usage of materials that would otherwise potentially damage or otherwise prevent the sale of RTE produce. For example, a prewash with a phosphoric acid and propylene glycol solution or with a silver dihydrogen citrate solution has proved particular effective when exposure times are controlled and limited. Such short-term wash systems are compatible with high levels of water recycling to manage total water use.

The above noted need for more robust processes for RTE produce provided a starting point for providing short-term wash treatments while managing overall water usage. In one more embodiments, four considerations for implementing this additional process strategy can be taken into consideration without compromising water management. First, one determines the best location for treatment. Second, one determines how that treatment will be carried out. Third, one determines the formulation of the treatment. And finally, one determines how this short-term wash treatment fits into the water reuse needs of the specific produce line. These considerations are combinatorial yielding many specific embodiments as discussed herein.

With regards to location, the range of possibilities is limited but not without choices. Given the nature of the intense treatments and their short durations, for example less than 1 minute, the treatment should be somewhat proximal to the primary wash stage such as the rotating drum short-term wash device 320 stage as illustrated in FIGS. 3 and 4. However, according to another embodiment, the treatment can be included in a cutting or chopping operation as illustrated in FIGS. 5 and 6. These intense short-term wash treatments are generally inappropriate for field application where the time of exposure would be highly variable and on the order of hours and perhaps days if the raw material is shipped to a regional processing facility. However, it should be noted that the short-term wash treatment application can be moved to an intermediate position between the primary and secondary stages as illustrated in FIG. 4 and still achieve the same type of benefits. This embodiment is particularly helpful where the short-term wash treatment was inhibited by materials removed in the primary wash by the first wash stage device 440.

With regards to how the treatment is applied, there are several operating parameters that are important to consider and also multiple types of equipment that can be considered as ways to control these parameters. Feed rate, dispersion, uniformity of coverage, and treatment time are operating parameters to consider. These are all interrelated and will depend on the equipment used for the treatment. For example, according to an embodiment, about 1 liter per minute is sufficient to wet the surface of all leaves when nozzles are place in a slicer/dicer short-term wash device 865, which may also be called a pilot plant shredder or a chopper/shredder short-term wash device as shown in FIG. 8 when the product feed rate is about 1 pound per minute. When the treatment is effected in the well mixed environment of such a slicer/dicer 865, the distribution and uniformity are almost assured. This not always the case for a set up that uses a timing belt 1030 as shown in FIG. 10 where feed rates needed to be controlled and limited to reduce product overlap in the active zone by using the timing belt 1030 between short-term wash and normal wash cycles. This set up allows easy adjustments and experimental treatments to explore the benefits of different short-term wash treatments, but a more active process can be provided using other devices as shown in other disclosed embodiments. For example, FIG. 7 illustrates a commercial approach using a rotating drum short-term wash device 720 that includes a rotating drum 725, that can also be called a rotating auger 725, that includes a chemical delivery system 723, that can also be called a central spray system 723, to achieve the needed dispersion and uniformity of coverage of the short-term wash treatment. Thus, one or more embodiments provide approaches to assure that the treatment solution contacts all parts of the product surface, and that contact time is limited to avoid quality loss.

With regards to formulation of the short-term wash treatment, a distinction is differential sensitivity to the intense solution components. It has been observed that the more intense short-term wash treatments have more impact on the bacteria/microbes of interest than on the produce allowing shorter treatment times with greater lethality and less quality loss. For each product, one can balance the lethality of the concentration and time of the process against the damage to the product and the related loss in shelf life. This is similar to the situation with thermal processing. Ultra-high-temperature (UHT) processing utilizes extremely high temperatures to process milk but for very short times. This extreme yields the best quality sterile milk. In contrast, fresh pasteurized eggs are processed for long times at moderate temperatures to avoid denaturing or cooking the eggs because the eggs are more sensitive to temperature than the bacteria. Using the short-term wash treatment allows for the process of produce processing to be more like milk in that we can use intense chemical treatments with short durations. In the extreme as with UHT milk, the minimum durations will only be limited by the ability to handle the RTE product without physical damage. The concentration and treatment times for any of these short-term wash treatments can be adjusted based on the product to be treated.

In accordance with one or more exemplary embodiments, it is possible, but not required, that any residues from the short-term wash treatment be removed from the product by the conventional wash treatment and wash device/system. If there are no residues and no residual activity, the treatment is to be considered a processing aid and not require inclusion on the ingredient statement. When this is the case, the conventional wash system can be viewed as quenching the short-term wash treatment.

There are many short-term wash treatments that can meet the different sensitivity and residue removal requirements. This number can be increased by including inert or at least non-interfering ingredients at various concentrations. As an example, a combined solution of about 6% phosphoric acid and about 2.5% propylene glycol is useful. This solution provides greatly enhanced lethality at the end of the conventional wash with treatment durations of 10 to 60 seconds. According to other exemplary embodiments, with different product handling equipment, higher concentrations and shorter durations are obvious extensions. In a traditional wash system adjuvants are generally present at levels less than a few hundred ppm which represent a lower bound where the short-term wash treatment becomes just another wash stage and would not be expected to add useful additional lethality.

It is possible that this intense short-term wash treatment renders the bacterial microbes more susceptible to inactivation by the chlorine in the wash system. The phosphoric acid and propylene glycol residual are lost in the wash system where they act in concert with the other constituents of the wash system. Similar behavior is observed with other acids and simple polyols. Treatments with this family of materials are generally limited to less than a minute with an optimum around 30 seconds to avoid quality loss. Short-term wash treatment solutions without the polyol and just the acid, particularly citric, lactic, or acetic acids, are beneficial, but such solutions are often less effective than the comparable solution with the polyol. As part of managing the overall water usage of the wash system, the short-term wash treatment can be formulated with water from the primary wash system. There are other water management opportunities discussed in the exemplary embodiments provided herein.

As another formulation example, 10-50 ppm silver dihydrogen citrate in 3-5% citric acid can be provided in the short-term wash treatment. This combination adds a new mechanism of lethality which acts synergistically with the conventional wash system. For example, the chlorine in a conventional wash system will produce chloride which will inactivate the silver and facilitate removal during the wash leaving minimal residues. This short-term wash treatment solution is made with essentially chloride-free water—otherwise the silver ions are sequestered by any present chloride.

Another formulation example of the short-term wash treatment is a hybrid between the two mentioned above. Particularly, silver dihydrogen citrate can be diluted in a lactic acid glycerin solution maintaining the neutral charge for the silver complex and gaining the complementary benefits of the acid polyol system.

Further, water use and reuse are increasingly important in RTE produce wash systems. This complexity devolves from the cost of water, the cost of discharging water, the cost of water treatment chemicals and the cost of chilling the water. A short-term wash treatment that does not intrinsically include water reuse will be less desirable than a process that includes water reuse. Additionally, a process where the short-term wash treatment can be used for multiple passes will be inherently more interesting than one which does not allow reuse provided the pretreatment does not lose effectiveness. With these constraints in mind, one approach to this water management challenge is to filter and reuse the wash treatment solution. There will be some losses to the conventional wash system, but these losses will partially avoid the addition of make-up water to the conventional wash system. Alternatively, the short-term wash treatment can be used once prior to being used with dilution in the primary wash treatment and system. Some of the numerous approaches are specifically examined in the specific embodiments discussed herein.

Another embodiment can be superior for a mechanically sensitive product that does need to be chopped or cut. For example, baby leaf product including spinach can be treated with an air column spray system 970, which can also be called an air column short-term wash device 970, as illustrated in FIG. 9. The leaves are dropped into an air column system 976 surrounded by a chemical delivery system spray devices 973. The air column system 976 has reverse air flow to insure that leaves receive a coating of the short-term treatment solution prior to being deposited on a treatment transfer belt (30 seconds) before entering a two-tank flotation system 640, 650 such as shown in FIG. 6. In accordance with one or more embodiments other short-term wash treatments could be substituted depending on the produce. In this embodiment, the transfer belt 978 serves as a drain scroll and timing belt to allow recycling the short-term wash treatment solution such as a phosphoric acid (4%) and propylene glycol (2%) solution. The carryover on product from this retreatment contributes to the pH control of the primary wash tank reducing the need for other chemicals. There are many factors that affect the total lethality of this system such as product overload, inadequate chlorine in the flotation tanks, or incomplete pH control. When these basic operating parameters are controlled, substantial increases in lethality are achieved over similar wash systems.

The embodiment shown in FIG. 6 incorporates an additional water management feature along with the short-term wash treatment. As shown, product is dumped into a slicer/dicer 660 before being rinsed. Product could be rinsed by other means if cutting was not needed as for baby greens. This rinsing step removes soil, and if product is cut, cell and tissue debris so it does not enter the balance of the wash system. The small amount of water used for this rinse step can be processed to allow reuse by centrifugation, filtration or other well-known techniques. In some cases it may simply be better to make this single use water, particularly if this water has already been used in later operations making it part of a more extreme counter flow usage of water. This rinse step delivers field debris free product that is substantially free from tissue debris from cutting to the prewash treatment. This two stage pretreatment can greatly enhance the useful life of the short-term wash treatment solutions in the wash system and the recycled short-term wash treatment. The water from this rinse step can be derived from the primary wash system as it need not be new water.

According to an exemplary embodiment, spinach that is inoculated to $10^4$ cfu/g with a mixed culture of generic *E. coli* can be washed using the short-term wash treatment. For example, this spinach can be sliced and treated with various short-term wash treatments prior to washing through a commercial two stage Jacuzzi wash system at pH 5 at 15 ppm free chlorine. Treatments included city water as a control, SW™ and SWO™ (SmartWash Solutions LLC, Salinas, Calif.) and 50% Citric acid. It should be noted that although the citric acid solution was most effective, it turned the product unacceptably yellow when a 30-second treatment time is used in such an exemplary embodiment. After short-term wash treatment, samples collected and examined for residual *E. coli* may provide the following comparative total log reductions are reported in the following table 1:

TABLE 1

| Prewash Treatment | Log Reduction in *E. coli* |
| --- | --- |
| City Water | 1 |
| 1:2 dilution SW:City Water | 2.5 |
| 1:2 dilution of SWO:City Water | 2.5 |
| 50% Citric acid | 3 |

Further, according to another embodiment a short-term wash treatment can work with a produce wash system in the control of lachrymator release from cut, chopped or sliced onions. Specifically, the coordination between the wash system and the short-term wash treatment is one of contrast. A solution of 0.05 to 0.25% bisulfite in dilute acid with a diol or other small polyol is applied to onions during the cutting process. Normally this would prompt labeling requirements on the finished product. However, in this case, the bisulfite reacts completely with the oxidizer in the wash system removing the sulfite residue. This treatment protected sensitive individuals from the lachrymators of the onions during a chopping operation. Also, sulfite levels were considerably less than the raw onions which are noted to be a high sulfite food.

In reducing this embodiment to practice, it has been found that 20 g of sodium bisulfite and 500 mls of either Smart-Wash Solution SW, SWO, or SWPro (SmartWash Solutions LLC, Salinas, Calif.), all of which are sources of acidity and diol functionalities, can be mixed with 30 gallons of water to effect treatment of onions. The described short-term wash treatment solution can be sprayed at a rate of 1 liter/min into the cutting chamber where onions are chopped at a rate of 200 pounds per hour. Clearly, there is a range of application rates that can be considered depending on the onion feed rate and the specific configuration of the equipment. It is important that the solution contact the onion close to simultaneously with the cutting because delays allow time for lachrymator generation. The duration of treatment and the time to removal of the solution is not of particular importance. In this reduction to practice, according to an exemplary embodiment, it may be convenient to go directly from the chopper to flume wash system given treatment times of a couple seconds.

According to one or more embodiments, strong oxidants such as electrolyzed water or plasma activated water and other active oxygen species such as ozone or peroxides can be used at higher concentrations for short treatments which are too aggressive for extended exposure. These treatments are readily quenched by dilution in the main wash system. Therefore, the short-term wash treatment can include one or more of these strong oxidants.

It should be apparent from the foregoing that embodiments of an invention having significant advantages have been provided. While the embodiments are shown in only a few forms, the embodiments are not limited but are susceptible to various changes and modifications without departing from the spirit thereof.

For example, in an alternative embodiment, a produce wash system including a process stream including a short-term wash device followed by a wash device, a short-term wash treatment that is applied by the short-term wash device to a product, wherein the short-term wash treatment remains on the product for a pretreatment time that lasts until the product reaches the wash device, and a wash treatment that is applied by the wash device to the product, wherein the wash treatment rinses the short-term wash treatment from the product defining the end of the pretreatment time. The pretreatment time is set at or below a damage threshold time beyond which the short-term wash treatment damages the product beyond a damage threshold.

The short-term wash treatment may provide at least one or more from a group consisting of antimicrobial properties, potentiating properties for the antimicrobial action of the subsequent wash device and wash treatment, and controlling properties for controlling lachrymator release from the produce.

In another embodiment, the product may be fresh produce that is at least one selected from a group consisting of whole, sliced, cut, and chopped leafy greens including but not limited to lettuce, spinach, cabbage, and kale, and vegetables including but not limited to broccoli, onions, bell peppers, and squash.

In another embodiment, the product may be a meat product that is at least one selected from a group consisting of beef, pork, lamb, veal, game, and poultry that includes but is not limited to whole, parted, and boned poultry.

In another embodiment, the short-term wash device includes a spray device that is configured to spray the short-term wash treatment on the product.

In another embodiment, the short-term wash device may further include at least one from a group consisting of a rotating drum short-term wash device, an air column short-term wash device, a slicer/dicer device, a spray curtain, a shaker, and a timing belt, wherein the spray device may be integrated with the at least one from the group to spray the short-term wash treatment on the product.

In another embodiment, the short-term wash device may include a product submersing device that is configured to receive and submerse the product into the short-term wash treatment followed by the product being sifted out of the short-term wash treatment.

In another embodiment, the product submersing device may be at least one selected from of a group consisting of a rotating drum short-term wash device, a submersing pool pretreatment device, an agitating pool pretreatment device, and a spray curtain with brushes.

In another embodiment, the short-term wash treatment may include an acidulant and a polyol. The acidulant may be one selected from a group consisting of a phosphoric acid and lactic acid, and the acidulant is from 0.1% to 10% of the short-term wash treatment, and the polyol maybe one selected from a group consisting of a glycerin and a propylene glycol, and the polyol is from 0.1% to 10% of the short-term wash treatment.

In another embodiment, the pretreatment time the short-term wash treatment remains on the product may be between 3 seconds and 1.5 minutes at a temperature between 30° F. and 50° F.

In another embodiment, the wash treatment may include free active chlorine from 2 to 40 ppm of the wash treatment, a compatible acidulant selected from a group consisting of phosphoric acid, citric acid, and lactic acid, and wherein the compatible acidulant is from 10 to 1000 ppm of the wash treatment, and a polyol selected from a group consisting of a glycerin and a propylene glycol, and wherein the polyol is from 2 to 500 ppm of the wash treatment.

In another embodiment, the short-term wash treatment may include a coordinating acid and silver ions, wherein the coordinating acid is one selected from a group consisting of a citric acid and a lactic acid and is from 3% to 5% of the short-term wash treatment, and wherein the silver ions are from 10 to 50 ppm of the short-term wash treatment.

In another embodiment, the pretreatment time the short-term wash treatment remains on the product may be between 3 seconds and 1.5 minutes at a temperature between 30° F. and 50° F.

In another embodiment, the wash treatment may include a compatible acidulant selected from a group consisting of phosphoric acid, citric acid, and lactic acid, wherein the compatible acidulant is from 10 to 1000 ppm of the wash treatment, a polyol selected from a group consisting of glycerin and propylene glycol, wherein the polyol is from 1 to 500 ppm of the wash treatment, free active chlorine from 2 to 40 ppm of the wash treatment, and chloride from 1 to 100 ppm of the wash treatment.

In another embodiment, the produce wash system may further include a transfer belt between the short-term wash device and the wash device, the transfer belt configured to serve as a drain scroll to recycle the short-term wash treatment, and a timing belt that is configured to help complete the pretreatment time.

In another embodiment, the short-term wash treatment and short-term wash device may be configured to account for at least one of product overload, inadequate chlorine in a flotation tank, and incomplete pH control.

In another embodiment, the short-term wash treatment may provide a supplemental wash lethality of greater than 1 log against microbes found on the product as compared to the lethality of the wash treatment in the wash system alone.

In another embodiment, there is provided a pre-rinse prior to the short-term wash treatment. This pre-rinse is positioned so as to prevent soil and debris from interfering with the short-term wash treatment or from being carried over into the wash system. It can be advantages to make this pre-rinse the last use of wash water prior to disposal. In another alternative embodiment, for example, there is provided a method of produce washing using a short-term wash device. The method includes processing a product through the short-term wash device followed by a wash device, applying a short-term wash treatment using the short-term wash device to the product such that the short-term wash treatment remains on the product for a pretreatment time that lasts until the product reaches the wash device, and applying a wash treatment using the wash device to the product such that the wash treatment rinses the short-term wash treatment from the product defining the end of the pretreatment time, wherein the pretreatment time is set at or below a damage threshold time beyond which the short-term wash treatment damages the product beyond a damage threshold.

In another alternative embodiment, for example, there is provided a short-term wash treatment that includes an acidulant selected from a group consisting of a phosphoric acid and lactic acid, wherein the acidulant is from 0.1% to 10% of the short-term wash treatment, and a polyol selected from a group consisting of a glycerin and a propylene glycol, wherein the polyol is from 0.1% to 10% of the short-term wash treatment, wherein a pretreatment time the short-term wash treatment remains on the product is between 3 seconds and 1.5 minutes at a temperature between 30° F. and 50° F.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A method of washing food using a short-term wash device, the method comprising:
   applying, using the short-term wash device, a short-term wash treatment solution to a product;
   applying, using a wash device coupled to the short-term wash device, a wash treatment to the product such that the wash treatment rinses the short-term wash treatment solution from the product, wherein:
      the short-term wash treatment solution is applied to the product for a shorter duration than the wash treatment is applied to the product;
      the short-term wash treatment solution is chemically different from the wash treatment;
      the short-term wash treatment solution is a combined solution comprising an acidulant and a polyol; and
   the wash treatment comprises:
      a compatible acidulant selected from a group consisting of phosphoric acid, citric acid, and lactic acid with the compatible acidulant from 10 to 1000 ppm by weight of the wash treatment;
      a polyol selected from a group consisting of glycerin and propylene glycol with the polyol from 1 to 500 ppm by weight of the wash treatment;
      free active chlorine from 2 to 40 ppm by weight of the wash treatment;
      chloride from 1 to 100 ppm by weight of the wash treatment; and
      peroxyacetic acid from 1 to 100 ppm by weight of the wash treatment.

2. The method of claim 1, wherein the short-term wash treatment solution provides a supplemental wash lethality of greater than 1 log against microbes found on the product as compared to the lethality of the wash treatment in the wash device alone.

3. A method of washing food using a short-term wash device, the method comprising:
   applying, using the short-term wash device, a short-term wash treatment solution to a product;
   applying, using a wash device coupled to the short-term wash device, a wash treatment to the product such that the wash treatment rinses the short-term wash treatment solution from the product, wherein:
      the short-term wash treatment solution is applied to the product for a shorter duration than the wash treatment is applied to the product;
      the short-term wash treatment solution is chemically different from the wash treatment; and
      the short-term wash treatment solution is a combined solution comprising an acidulant and a polyol;
   determining a damage threshold for the product;
   determining a damage threshold time beyond which the short-term wash treatment solution damages the product beyond the damage threshold; and
   setting a pretreatment time at or below the damage threshold time, wherein the short-term wash treatment solution remains on the product for the pretreatment time.

4. The method of claim 3, wherein the pretreatment time is between 3 seconds and 1.5 minutes at a temperature between 30° F. and 50° F.

5. The method of claim 3, wherein the product comprises produce that is at least one selected from a group consisting of leafy greens, broccoli, onions, bell peppers, and squash.

6. The method of claim 3, wherein the product comprises a meat product that is at least one selected from a group consisting of beef, pork, lamb, veal, game, and poultry.

7. The method of claim 3, further comprising:
   applying a pre-rinse with wash water to the product prior to applying the short-term wash treatment solution; and
   disposing of the wash water directly after applying the pre-rinse.

8. The method of claim 3, wherein the short-term wash treatment solution provides at least one or more from a group consisting of antimicrobial properties, potentiating properties for antimicrobial action of the wash device and the wash treatment, and controlling properties for controlling lachrymator release from the product.

9. The method of claim 3, wherein:
   the acidulant is one selected from a group consisting of phosphoric acid, lactic acid, acetic acid, and bisulfide acid;
   the acidulant is between 0.1% to 10% by weight of the short-term wash treatment solution;

the polyol is one selected from a group consisting of a glycerin and a propylene glycol; and the polyol is from 0.1% to 10% by weight of the short-term wash treatment solution.

10. The method of claim 9, wherein the wash treatment comprises:
free active chlorine from 2 to 40 ppm by weight of the wash treatment;
a compatible acidulant selected from a group consisting of phosphoric acid, citric acid, and lactic acid, wherein the compatible acidulant is from 10 to 1000 ppm by weight of the wash treatment; and
a polyol selected from a group consisting of a glycerin and a propylene glycol, wherein the polyol is from 2 to 500 ppm by weight of the wash treatment.

11. The method of claim 3, further comprising determining at least one of product overload, inadequate chlorine in a flotation tank, and incomplete pH control with respect to the short-term wash treatment solution or the short-term wash device.

12. The method of claim 3, wherein the short-term wash treatment solution provides a supplemental wash lethality of greater than 1 log against microbes found on the product as compared to the lethality of the wash treatment in the wash device alone.

13. The method of claim 3, wherein:
the short-term wash device comprises at least one from a group consisting of a rotating drum short-term wash device, an air column short-term wash device, a slicer/dicer short-term wash device, a spray curtain, a shaker, and a timing belt; and
applying the short-term wash treatment solution comprises spraying, with a spray device integrated with the at least one from the group, the short-term wash treatment solution on the product.

14. The method of claim 3, wherein applying the short-term wash treatment solution to the product comprises:
submersing the product into the short-term wash treatment solution; and
sifting the product out of the short-term wash treatment solution.

15. The method of claim 3, wherein applying the short-term wash treatment solution comprises spraying the short-term wash treatment solution on the product.

16. The method of claim 3, wherein the wash treatment comprises:
a compatible acidulant selected from a group consisting of phosphoric acid, citric acid, and lactic acid with the compatible acidulant from 10 to 1000 ppm by weight of the wash treatment;
a polyol selected from a group consisting of glycerin and propylene glycol with the polyol from 1 to 500 ppm by weight of the wash treatment;
free active chlorine from 2 to 40 ppm by weight of the wash treatment;
chloride from 1 to 100 ppm by weight of the wash treatment; and peroxyacetic acid from 1 to 100 ppm by weight of the wash treatment.

17. A method of washing food using a short-term wash device, the method comprising:
applying, using the short-term wash device, a short-term wash treatment solution to a product;
applying, using a wash device coupled to the short-term wash device, a wash treatment to the product such that the wash treatment rinses the short-term wash treatment solution from the product, wherein:
the short-term wash treatment solution is applied to the product for a shorter duration than the wash treatment is applied to the product;
the short-term wash treatment solution is chemically different from the wash treatment; and
the short-term wash treatment solution is a combined solution comprising an acidulant and a polyol;
recycling the short-term wash treatment solution by draining the short-term wash treatment solution from the product as the product is transferred through the short-term wash device; and
adjusting a pretreatment time for which the short-term wash treatment solution remains on the product by adjusting a speed of the product between the short-term wash device and the wash device.

18. The method of claim 17, wherein the wash treatment comprises:
a compatible acidulant selected from a group consisting of phosphoric acid, citric acid, and lactic acid with the compatible acidulant from 10 to 1000 ppm by weight of the wash treatment;
a polyol selected from a group consisting of glycerin and propylene glycol with the polyol from 1 to 500 ppm by weight of the wash treatment;
free active chlorine from 2 to 40 ppm by weight of the wash treatment;
chloride from 1 to 100 ppm by weight of the wash treatment; and
peroxyacetic acid from 1 to 100 ppm by weight of the wash treatment.

19. The method of claim 17, wherein the short-term wash treatment solution provides a supplemental wash lethality of greater than 1 log against microbes found on the product as compared to the lethality of the wash treatment in the wash device alone.

20. The method of claim 17, wherein:
the acidulant is one selected from a group consisting of phosphoric acid, lactic acid, acetic acid, and bisulfide acid;
the acidulant is between 0.1% to 10% by weight of the short-term wash treatment solution;
the polyol is one selected from a group consisting of a glycerin and a propylene glycol; and
the polyol is from 0.1% to 10% by weight of the short-term wash treatment solution.

* * * * *